(12) United States Patent
Takanashi

(10) Patent No.: US 7,615,165 B2
(45) Date of Patent: Nov. 10, 2009

(54) LIQUID CRYSTAL MOLECULE, LIQUID CRYSTAL DISPLAY AND LIQUID CRYSTAL OPTICAL SPATIAL MODULATION DEVICE

(75) Inventor: Hidehiko Takanashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 195 days.

(21) Appl. No.: 11/874,051

(22) Filed: Oct. 17, 2007

(65) Prior Publication Data

US 2008/0143950 A1 Jun. 19, 2008

(30) Foreign Application Priority Data

Dec. 19, 2006 (JP) .......................... P2006-341701

(51) Int. Cl.
*C09K 19/00* (2006.01)
*C09K 19/06* (2006.01)
*C09K 19/52* (2006.01)

(52) U.S. Cl. .............................. 252/299.01; 252/299.6; 252/299.61; 252/299.62; 252/299.64; 430/20; 428/1.1

(58) Field of Classification Search ............ 252/299.01, 252/299.6, 299.61, 299.62, 299.64; 430/20; 428/1.1
See application file for complete search history.

(56) References Cited

U.S. PATENT DOCUMENTS

| 5,211,877 A | * | 5/1993 | Andrejewski et al. | .. 252/299.01 |
| 5,502,206 A | | 3/1996 | Zahn et al. | |
| 5,690,858 A | | 11/1997 | Nohira et al. | |
| 5,695,680 A | * | 12/1997 | Weitzel et al. | ......... 252/299.01 |
| 6,294,109 B1 | | 9/2001 | Ratna et al. | |
| 2002/0130299 A1 | | 9/2002 | Wand | |
| 2003/0003245 A1 | | 1/2003 | Gough | |

FOREIGN PATENT DOCUMENTS

| DE | 19521533 | 12/1996 |
| EP | 0355008 | 2/1990 |
| EP | 0643120 | 3/1995 |
| GB | 2274652 | 8/1994 |
| GB | 2317186 | 3/1998 |
| WO | 02/18514 | 3/2002 |
| WO | 2005/019380 | 3/2005 |
| WO | 2005/077101 | 8/2005 |
| WO | 2007/123844 | 11/2007 |

OTHER PUBLICATIONS

Garoff, et al., Physical Review Letters, vol. 38, Apr. 11, 1977 p. 848.
Naciri, et al., Chem. Mater. 1995, 7, pp. 1397-1402.
Naciri J., et al.: "Novel Ferroelectric and Electroclinic Organosiloxane Liquid Crystals" Chemistry of Materials, American Chemical Society, Washington, US, vol. 7, No. 7, Jul. 1, 1995, pp. 1397-1402, XP000626857.
Garoff S., et al.: "Electroclinic Effect at the A-C Phase Change in a Chiral Smectic Liquid Crystal" Physical Review Letters, America Physical Society, New York, US, vol. 38, 1997 p. 848, XP008088922.

* cited by examiner

*Primary Examiner*—Geraldina Visconti
(74) *Attorney, Agent, or Firm*—K&L Gates LLP

(57) ABSTRACT

A liquid crystal display device has a liquid crystal layer including liquid crystal molecules, each of which has an asymmetric carbon atom, and has a core portion and an organosilane or organosiloxane structure at positions opposed to each other with the asymmetric carbon atom therebetween.

4 Claims, 4 Drawing Sheets

LIQUID CRYSTAL MOLECULE, LIQUID CRYSTAL DISPLAY AND LIQUID CRYSTAL OPTICAL SPATIAL MODULATION DEVICE

CROSS REFERENCES TO RELATED APPLICATIONS

The present application claims priority to Japanese Patent Application JP 2006-341701 filed in the Japan Patent Office on Dec. 19, 2006, the entire contents of which being incorporated herein by reference.

BACKGROUND

The present application relates to a liquid crystal molecule, and to a liquid crystal display device and a liquid crystal optical spatial modulation device which use the liquid crystal molecule.

In recent years, liquid crystal display devices (LCD) of the active matrix drive type such as TFTs (Thin Film Transistors) have come to be used widely, in the range from small mobile use to large TV sets. In addition, the LCDs have been being enhanced in response speed by adopting new techniques such as impulse drive. Notwithstanding this trend, however, the LCDs are still inferior to plasma displays (PDP), field emission displays (FED) and the like in display quality regarding dynamic images due, for example, to dynamic image blur arising from the slow response speed of the liquid crystal material itself.

Meanwhile, attempts have been being made to enhance the speed from the current 60 Hz frame rate drive to 120 Hz or 240 Hz (high frame rate drive) and to enhance the dynamic image display quality. The dynamic display quality in the LCD depends mostly on the response characteristics of the liquid crystal material itself, though depending partly on the drive system including TFTs. In other words, the above-mentioned problem may not radically be solved, and the high frame rate drive may not be realized, unless the liquid crystal material comes to be capable of high-speed response.

Thus, there is a keen demand for a liquid crystal material which can cope with the high frame rate drive and which can exhibit high-speed response permitting the realization of a high dynamic image display quality.

Examples of the liquid crystal known to be able to realize high-speed response include the nematic liquid crystal attended by the flexoelectric effect, the ferroelectric liquid crystal, and the antiferroelectric liquid crystal. The present inventor has paid attention to the electroclinic effect in the smectic A phase.

The electroclinic effect is the phenomenon in which when an electric field is impressed on liquid crystal molecules uniaxially aligned in the smectic A phase, the optical axis of the liquid crystal molecules (the liquid crystal molecule longitudinal axis) is inclined according to the intensity of the electric field (refer to Garoff, et al, Physical Review Letters, Vol. 38, 1977, p. 848, hereinafter referred to as Non-Patent Document 1). When this type of cell is disposed between orthogonal polarizing plates, a transmitted light quantity according to the angle (tilt angle) between the optical axis of the polarizing plate and the optical axis of the liquid crystal is obtained (formula (A)), and a maximum transmittance is obtained at a tilt angle of ±45°.

$$T/T_0 = \sin^2(2\theta) \times \sin^2(\pi \Delta n d/\lambda) \quad (A)$$

where T is transmitted light quantity, $T_0$ is incident light quantity, $\theta$ is the angle (tilt angle) between the optical axis of the polarizing plate and the optical axis of the liquid crystal, $\Delta n$ is the birefringence of the liquid crystal, d is the thickness of the liquid crystal layer, and $\lambda$ is the wavelength of the transmitted light.

The dependency of the transmittance on the tilt angle, in the case of a retardation (=$\Delta n d$) giving the maximum transmittance, was calculated by formula (A), the results being shown in FIG. 8.

The response time in the electroclinic effect is as short (fast) as several to several tens of microseconds. In addition, there is the merit that the optical axis inclination angle (tilt angle) is proportional to the field intensity (i.e., voltage modulation of transmitted light is possible) when the field intensity is low. In other words, this is a display mode very much suited to the active matrix drive.

However, the tilt angles in the electroclinic effect developed hitherto with liquid crystal materials have not been so large, and sufficient optical modulation has not been obtained successfully.

Examples of a liquid crystal material which shows a large tilt angle include materials in which a siloxane is added to a non-chiral terminal end. The reason for the large tile angle is considered to lie in that the addition of the siloxane, which is a functional group being larger in volume than ordinary alkyl chains and being flexible, to the terminal group of a molecule renders a core portion of the molecule (which portion contributes to optical modulation) more easily movable under the action of an electric field. According to Naciri, et al. Chem. Mater. 1995, 7, pp. 1397-1402, hereinafter referred to as Non-Patent Document 2, in the cases of liquid crystal molecules with a structure in which a siloxane is added to a non-chiral terminal end, a maximum tilt angle of 26° has been obtained. However, it is seen from formula (A) that the transmittance obtainable with the tilt angle of 26° is about 60% at best, which is still insufficient in consideration of putting a display device or the like including the liquid crystal material into practical use.

SUMMARY

Thus, there is a need for a liquid crystal molecule which shows a large tilt angle in the electroclinic effect and which enables a sufficient optical modulation. There is also a need for a liquid crystal display device and a liquid crystal optical spatial modulation device which each use the just-mentioned liquid crystal.

It has been discovered that a further increase in tilt angle can be achieved by adding an organosilane or organosiloxane structure to a chiral terminal end having an asymmetric carbon atom in a liquid crystal molecule, unlike the liquid crystal material having a siloxane added to a non-chiral terminal end as described in the above-mentioned Non Patent Documents.

According to an embodiment, there is provided a liquid crystal molecule having an asymmetric carbon atom, and having a core portion and an organosilane or organosiloxane structure at positions opposed to each other with the asymmetric carbon atom therebetween.

According to another embodiment, there is provided a liquid crystal molecule having a structure of the following general formula (1):

[Chem 1]

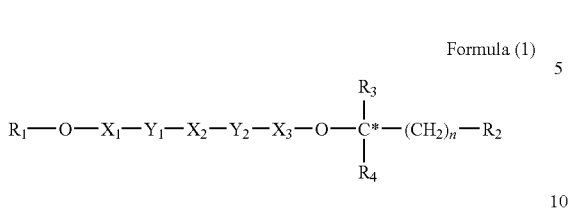

Formula (1)

where $R_1$ is a branched or unbranched hydrocarbon group having 4 to 16 carbon atoms, $R_2$ is a branched or unbranched organosiloxane or organosilane structure having 2 to 6 silicon atoms, * represents a chiral center, n=1 to 6, $R_3$ and $R_4$ are selected from among H, $CH_3$, $OCH_3$, F, Cl, Br, CN, and $CF_3$ so that they are different from each other;

$Y_1$ and $Y_2$ are each selected from among the groups of formulas (a), in which - (hyphen) means omission; and $X_1$ is a group selected from among the groups of formulas (b), $X_2$ is a group selected from among the groups of formulas (c), in which - (hyphen) means omission, and $X_3$ is a group of formula (d).

[Chem 2]

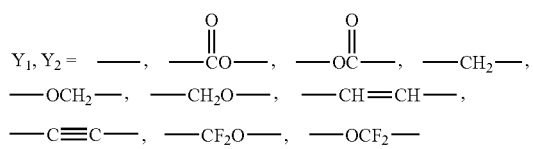

(a)

[Chem 3]

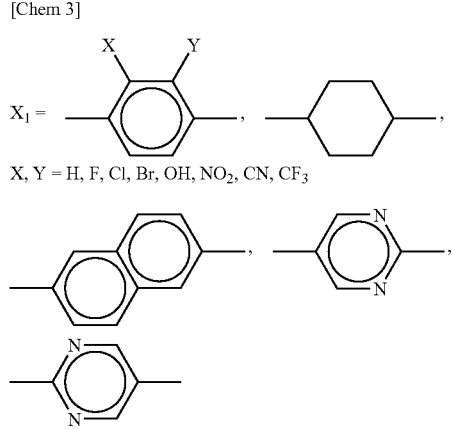

X, Y = H, F, Cl, Br, OH, $NO_2$, CN, $CF_3$ (b)

[Chem 4]

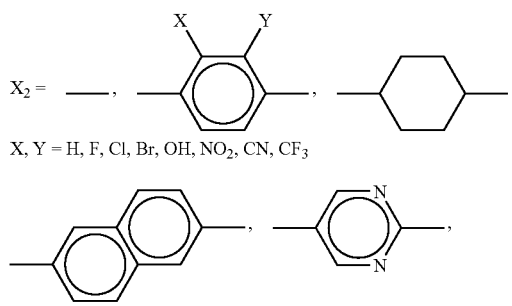

X, Y = H, F, Cl, Br, OH, $NO_2$, CN, $CF_3$ (c)

[Chem 5]

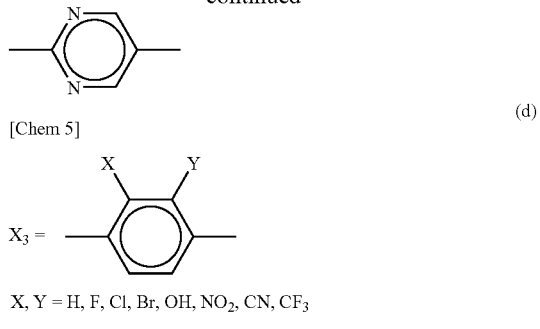

X, Y = H, F, Cl, Br, OH, $NO_2$, CN, $CF_3$ (provided at least one of X and Y is non-H)

According to a further embodiment, there is provided a liquid crystal display device comprising a pair of transparent substrates, a liquid crystal layer having liquid crystal molecules of the embodiments, so disposed as to fill up a gap between the substrates, the liquid crystal molecules being in a smectic A phase in which they are oriented uniaxially, and electrodes provided on said substrates, wherein the transmittance of the liquid crystal layer is regulated by inclining the longitudinal axis of the liquid crystal molecules through impressing an electric field on the liquid crystal layer through the electrodes.

According to yet another embodiment, there is provided a liquid crystal optical spatial modulation device comprising a pair of transparent substrates, a liquid crystal layer having liquid crystal molecules of the embodiments so disposed as to fill up a gap between the substrates, the liquid crystal molecules being in a smectic A phase in which they are oriented uniaxially, and electrodes provided on said substrates, wherein spatial modulation with regard to light transmitted through the liquid crystal layer is conducted by impressing an electric field on the liquid crystal layer through the electrodes.

In accordance with an embodiment, there is obtained a liquid crystal molecule which is in the smectic A phase in the temperature region in use thereof, which shows a large tilt angle in the electroclinic effect, and which promises a sufficient optical modulation for use in a liquid crystal display device and a liquid crystal optical spatial modulation device.

In accordance with a further embodiment, there is obtained a display device being excellent in dynamic image display quality, being bright, and being high in gradation property and contrast. For example, the display device is applicable to direct view type LCDs, projection display micro liquid crystal devices (LCoS (Liquid Crystal on Silicon) and high-temperature polysilicon TFT-LCDs). Besides, particularly, it is made possible to realize a color display device based on field sequential drive using color sequential backlight illumination.

In accordance with the yet another embodiment, there is obtained a high-speed optical spatial modulation device capable of three-dimensional display and the like.

Additional features and advantages are described herein, and will be apparent from, the following Detailed Description and the figures.

DETAILED DESCRIPTION

Figure 1:
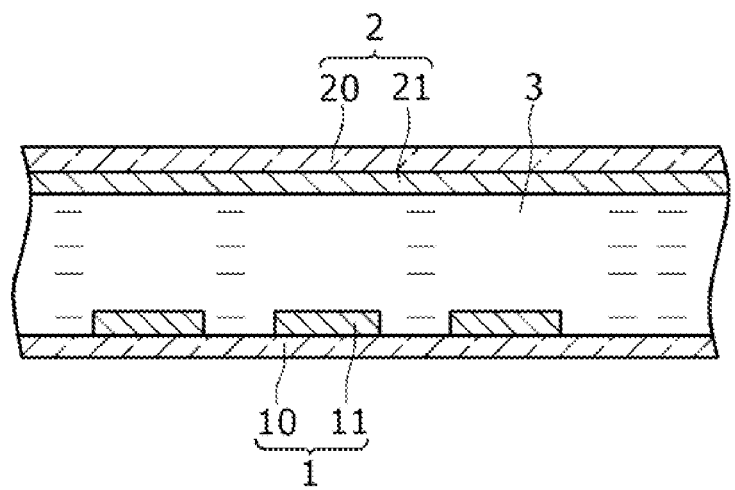
FIG. 1 is a sectional view showing the configuration of a liquid crystal display device based on an embodiment.

The liquid crystal molecule based on an embodiment will be described below in further detail with reference to the drawings.

First, the liquid crystal molecule according to an embodiment has an asymmetric carbon atom, and has a core portion and an organosilane or organosiloxane at positions opposed to each other with the asymmetric carbon atom therebetween.

In this case, the position of addition of the organosilane or organoxilosiloxane may be any position insofar as the position is on the opposite side of the core portion with respect to the asymmetric carbon atom, and may not necessarily be a terminal end.

Besides, from the viewpoints of chemical stability of the molecular structure and thermal stability of the liquid crystal phase, the number of silicon atoms contained in the organosilane or organosiloxane structure is preferably in the range of 1 to 6. Further, the structure is preferably a straight chain structure having 1 to 6 silicon atoms.

In another embodiment, the liquid crystal molecule has the structure of the following general formula (1).

[Chem 6]

$$R_1-O-X_1-Y_1-X_2-Y_2-X_3-O-\underset{\underset{R_4}{|}}{\overset{\overset{R_3}{|}}{C^*}}-(CH_2)_n-R_2 \quad \text{Formula (1)}$$

where $R_1$ is a branched or unbranched hydrocarbon group having 4 to 16 carbon atoms, $R_2$ is a branched or unbranched organosiloxane or organosilane structure having 2 to 6 silicon atoms, * represents a chiral center, n=1 to 6, $R_3$ and $R_4$ are selected from among H, $CH_3$, $OCH_3$, F, Cl, Br, CN, and $CF_3$ so that they are different from each other;

$Y_1$ and $Y_2$ are each selected from among the groups of formulas (a), in which - (hyphen) means omission; and $X_1$ is a group selected from among the groups of formulas (b), $X_2$ is a group selected from among the groups of formulas (c), in which - (hyphen) means omission, and $X_3$ is a group of formula (d).

[Chem 7]

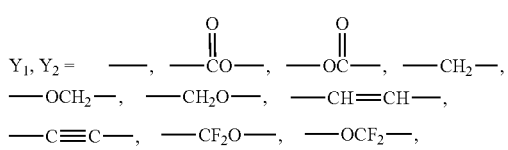

(a)

[Chem 8]

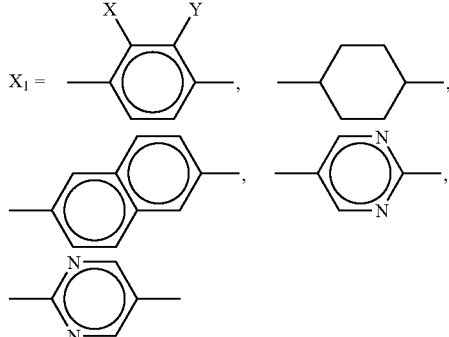

(b)

X, Y = H, F, Cl, Br, OH, $NO_2$, CN, $CF_3$

[Chem 9]

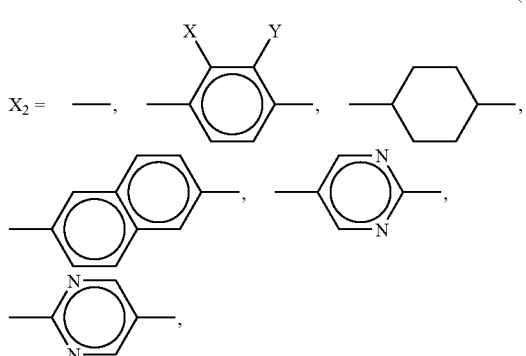

(c)

X, Y = H, F, Cl, Br, OH, $NO_2$, CN, $CF_3$

[Chem 10]

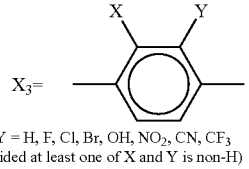

(d)

X, Y = H, F, Cl, Br, OH, $NO_2$, CN, $CF_3$
(provided at least one of X and Y is non-H)

Here, the liquid crystal molecule in an embodiment, preferably, forms a smectic liquid crystal layer and is in the smectic A phase in the temperature region in which the liquid crystal display device or the liquid crystal optical spatial modulation device is used, for example, 20 to 50° C. The smectic liquid crystal layer is a liquid crystal layer in which the longitudinal axis directions of the liquid crystal molecules are oriented in a layer form (smectic layer). The term "smectic A phase" herein means that, in such a liquid crystal layer, the normal direction of the liquid crystal layer coincides with the longitudinal axis direction of the liquid crystal molecules.

When the liquid crystal molecules as above are used, a tilt angle of not less than 30° is shown by the electroclinic effect, and the liquid crystal layer shows a transmittance of not less than 75%.

Now, the configuration of the liquid crystal display device based on an embodiment will be described. The liquid crystal display device herein means a so-called direct view type display device such that the display device using a liquid crystal material is viewed directly by the viewer.

FIG. 1 is a sectional view showing the configuration of the liquid crystal display device based on an embodiment. Here, a main part of a transmission type liquid crystal display device is shown, for which an active matrix driving system based on thin film transistor (TFT) drive is adopted as a driving system.

As shown in FIG. 1, a TFT array substrate 1 is used, in which switching TFTs or other pixel selecting circuits are formed on the basis of each of a plurality of pixels arranged in a matrix pattern on one side of a first substrate 10, and pixel electrodes 11 formed from a transparent electrode film such as an ITO film are provided in connection with the TFTs or other circuits. In addition, an opposite substrate 2 is used, in which color filters (not shown) are formed on one side of a second substrate 20, as necessary, and an opposite electrode 21 is formed over the whole surface area so as to cover the color filters. Further, phase difference plates, polarizing plates or the like (not shown) are formed at specific locations on the TFT array substrate 1 and the opposite substrate 2.

The TFT array substrate 1 and the opposite substrate 2 are adhered to each other through a sealing material, to form a gap therebetween, and a liquid crystal layer 3 composed of a liquid crystal mixture including the liquid crystal molecules based on the present application as above-mentioned is sealed in the gap through an orientation film (not shown). In this case, the liquid crystal molecules based on an embodiment are in the smectic A phase in which they are oriented uniaxially.

In the liquid crystal display device as above, a backlight unit including LEDs or the like is provided on the back side, the inclination (tilt angle) of the liquid crystal molecules is varied (through the electroclinic effect) by the voltages impressed between the pixel electrodes 11 and the opposite voltage 21, so as to control the transmittance and to regulate the transmission of light coming from the backlight unit, whereby an image with gradations can be displayed.

As for a driving system in relation to a picture signal, a 1H reversal driving system (H is horizontal scanning period) or a 1F reversal driving system (F is field) or the like can be adopted, and, in such an AC driving, the color level (gradation) of the liquid crystal can be varied by the height (magnitude of amplitude) of the driving voltage. Especially, the contrast of the image displayed can be further enhanced by enhancing this driving voltage.

In the liquid crystal display device based on an embodiment, the liquid crystal molecules are used, so that it is possible to display an image being excellent in dynamic image display quality, being bright, and being high in gradation property and contrast.

Now, the configuration of a liquid crystal optical spatial modulation device based on an embodiment will be described.

The liquid crystal optical spatial modulation device herein means a device for splitting on a plane basis the light from a certain light source and varying the intensity, phase or the like of each of the individual light beams thus obtained, and the device include the meanings of, for example, micro-displays (LCoS) or light valves used in projector displays, and phase modulation devices such as light deflection switches. As a specific example of the light valve, the liquid crystal display device shown in FIG. 1 may be applied. More specifically, light emitted from a light source is separated into red, green and blue rays, the color rays are modulated respectively by three light valves each composed of the liquid crystal display device based on an embodiment, and the thus modulated color beams are again synthesized, to be enlargedly projected on a projection surface.

Figure 2:
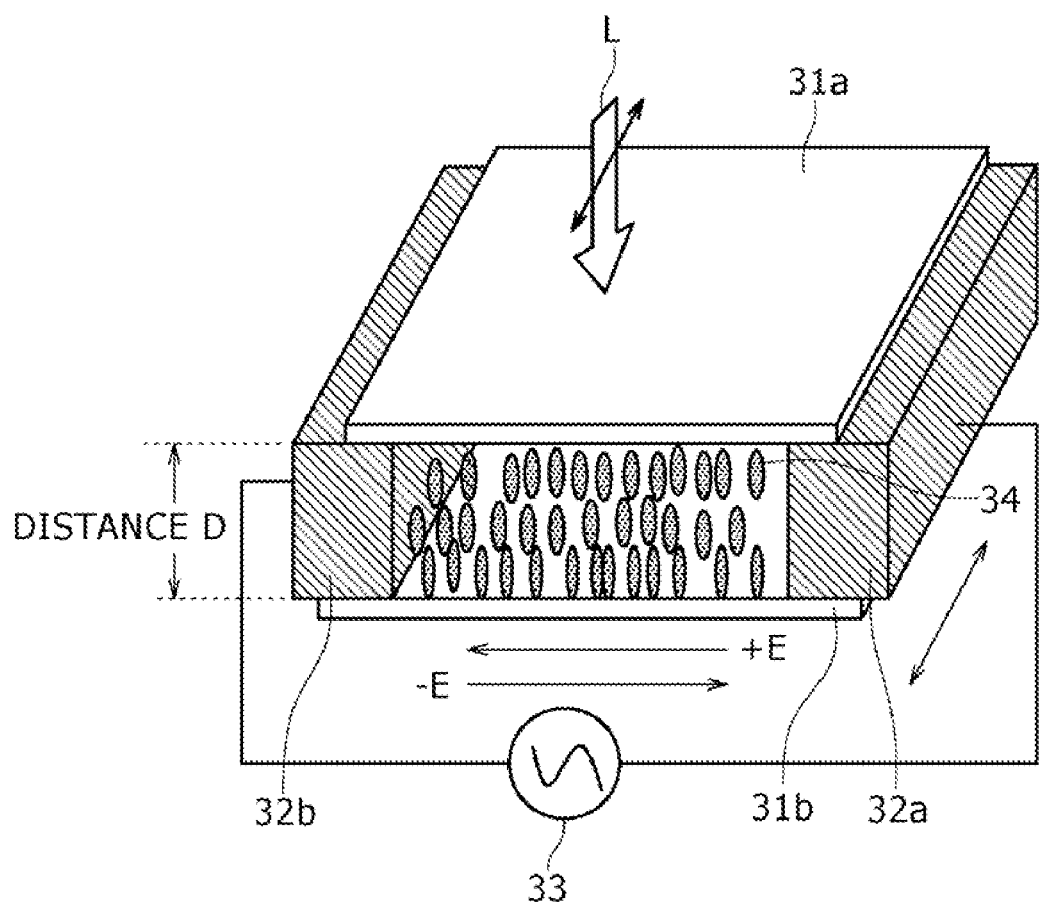
FIG. 2 is a schematic view showing the configuration of a liquid crystal optical spatial modulation device based on an embodiment.

FIG. 2 shows a configuration example of a light deflection switch as a liquid crystal optical spatial modulation device based on an embodiment.

As shown in FIG. 2, a pair of transparent substrates 31a, 31b made of a glass or the like are so disposed that their major surfaces are in parallel and opposed to each other with a predetermined spacing therebetween, and the opposed surfaces are coated with a vertical orienting agent for vertically orienting liquid crystal molecules. In addition, electrodes 32a, 32b are clamped between the transparent substrates 31a, 31b at both their ends in one direction, and an AC field is impressed between the electrodes 32a, 32b from an external driving device 33 for impressing an AC field. Besides, the above-mentioned liquid crystal molecules based on the present application are sealed between the transparent substrates 31a, 31b. The liquid crystal molecules are in the smectic A phase in the use environments for the liquid crystal optical spatial modulation device, and are oriented to be vertical to the major surfaces of the transparent substrates 31a, 31b in the absence of any electric field impressed thereon, due to the function of the vertical orienting agent.

In the liquid crystal optical spatial modulation device, the incident light L is incident in parallel to the normal to the substrates (vertically to the substrates) from the side of the substrate 31a. The incident light is deflected by the electric field impressed between the electrodes 32a, 32b into a direction orthogonal to the electric field direction, before going out of the device. For example, when the electric field E=0, the shifting of the incident light is not generated, whereas when the electric field E>0, the incident light is deflected (shifted) into a predetermined direction (+direction) orthogonal to the electric field direction, before going out of the device. When the electric field E<0, the incident light is deflected (shifted) into the direction (−direction) reverse to the direction in the case where the electric field E>0, before going out of the device. In addition, the amount of shifting in this case can be regulated by the intensity of the electric field.

EXAMPLES

Now, working examples of the present application will be described.

Example 1

Synthesis of Liquid Crystal Molecule

A liquid crystal molecule based on the present application was obtained in the following procedure.

<S11> First, after benzoyl chloride was added dropwise to a pyridine solution of 4,4'-biphenol, the admixture was stirred overnight at room temperature, and the resulting precipitate was filtered, followed by silica gel column chromatography, to obtain 4'-hydroxy-4-biphenyl benzoate as Intermediate Product 2.

<S12> Next, Intermediate Product 2 was dispersed in acetic acid, nitric acid was added dropwise to the dispersion while keeping it at 15° C., and water was further added thereto, followed by stirring. The resulting precipitate was recrystallized from ethanol/acetic acid, to obtain 4'-hydroxy-3'-nitro-4-biphenyl as Intermediate Product 3.

<S13> Subsequently, an argon-purged flask was charged with Intermediate Product 3, triphenylphosphine, and a tetrahydrofuran (THF) solution of (S)-5-hexen-2-ol, then a THF solution of diethyl azodicarboxylate was added dropwise thereto, and the reaction mixture was stirred overnight at room temperature. After the solvent was evaporated off, column chromatography was conducted, to obtain 4'-{[(R)-1-methyl-4-pentenyl]oxy}-3'-nitro(1,1'-biphenyl)-4-yl benzonate as Intermediate Product 4.

<S14> An aqueous solution of lithium hydroxide was added to a methanol solution of Intermediate Product 4, and the admixture was stirred overnight at room temperature. After evaporating-off of the solvent and neutralization with hydrochloric acid, the object matter was extracted with ethyl ether. The extract was dehydrated with magnesium sulfate, then the solvent was evaporated off, and column chromatography was conducted, to obtain 4'-{[(R)-1-methyl-4-pentenyl]oxy}-3'-nitro(1,1'-biphenyl)-4-ol as Intermediate Product 5.

<S15> Intermediate Product 5, p-dodecaoxybenzoic acid, and a dichloromethane solution of 4-dimethylaminopyridine were added to 1-(3-dimethylamino)-propyl)-3-ethylcarbodiimide methiodine, and the admixture was stirred overnight at room temperature. Then, the resulting solution was washed with water, followed by separation and by drying with sodium sulfate. After evaporating off the solvent, column chromatography was conducted, to obtain 4'-{[(R)-1-methyl-4-pentenyl]oxy}-3'-nitro(1,1'-biphenyl)-4-yl 4-(dodecyloxy)benzoate as Intermediate Product 6.

<S16> Dichloro(dicyclopentadienyl)platinum(II) as a catalyst was added to a THF solution of 1,1,3,3,3-pentamethyldisiloxane and Intermediate Product 6, and the reaction mixture was stirred in an argon atmosphere at 60° C. for 24 hr. After evaporating off the solvent, column chromatography was conducted, to obtain 4'-{[(S)-1-methyl-5-(1,1,3,3,3-pentamethyldisiloxanyl)pentyl]oxy}-3'-nitro[1,1'-biphenyl]-4-yl 4-(dodecyloxy)benzoate as the final product. The general structural formula of the final product is shown in the following formula (2).

[Chem 11]

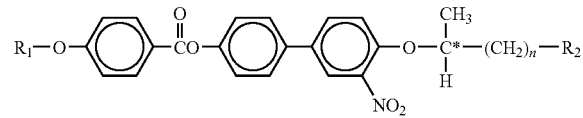

Formula (2)

Figure 3:
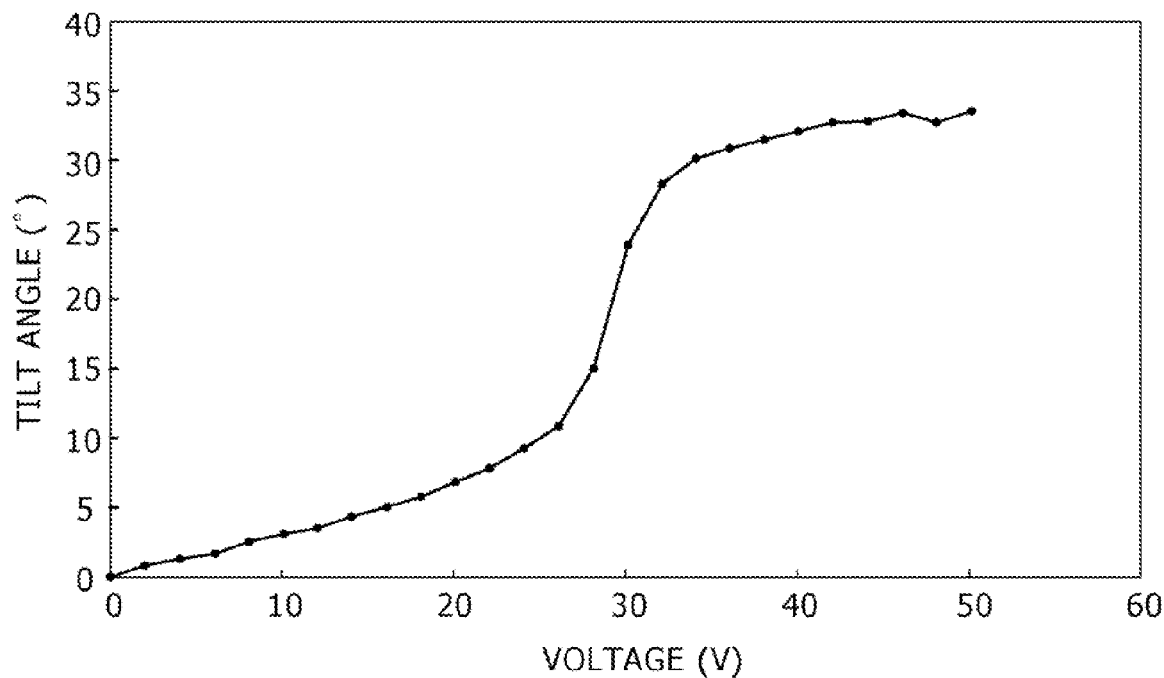
FIG. 3 is a diagram showing the relationship between voltage and tilt angle, for a cell under evaluation in Example 1.

The liquid crystal molecule in this example had the structural formula (2), wherein $R_1=C_{12}H_{25}$, n=4, $R_2=Si(CH_3)_2-O-Si(CH_3)_3$. The final product was in the smectic A phase at 37 to 56° C. The dependency of tilt angle on impressed voltage at 40° C. is shown in FIG. 3.

Incidentally, determination of the phase transition temperature and identification of the smectic A phase were carried out by differential scanning calorimetry and polarizing microscope observation with a hot stage.

(2)Fabrication of Evaluation Cell

After a polyimide orientation film is formed on a glass substrate provided with ITO (Indium Tin Oxide), rubbing with a buffed roller was conducted, a cell was formed by use of a UV-curing resin with 2.4 μm diameter silica balls dispersed therein, and the liquid crystal molecules synthesized by the above-mentioned method were poured into the cell at a temperature for promising an isotropic phase, to obtain an evaluation cell.

(3)Evaluation of Evaluation Cell

The evaluation cell obtained as above was evaluated as to maximum tilt angle, transmittance, and response time.

As to the maximum tilt angle, the evaluation cell was disposed between orthogonal polarizing plates, the transmitted light quantity was measured while impressing a rectangular wave electric field on the cell, and one half of the angle between the polarizing plate optical axis and the optical axis of the evaluation cell such as to give a minimum light quantity respectively under positive- and negative-polarity electric fields was adopted as the tilt angle.

As for the transmittance, the optical axis in the absence of any electric field of the evaluation cell was set to coincide with the optical axis of the polarizing plate of a polarizing microscope, the transmitted light quantity upon impressing an electric field giving a maximum tilt angle was measured by spectrophotometer, and the transmittance was calculated by taking the value with parallel polarizing plate arrangement as 100%.

Further, as for the response time, the same optical arrangement as that for measurement of transmittance was used, and the rise time in the case where a voltage such as to give a maximum tilt angle is impressed stepwise from zero electric field was taken as the response time.

Example 2

Figure 4:
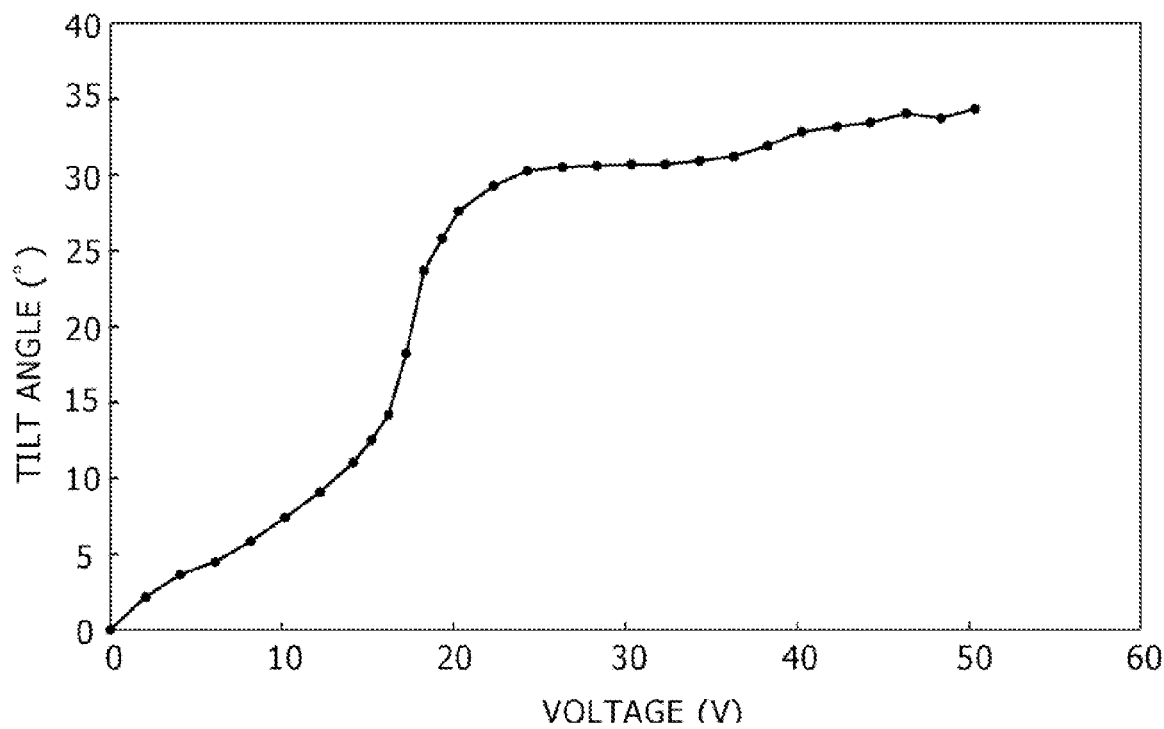
FIG. 4 is a diagram showing the relationship between voltage and tilt angle, for a cell under evaluation in Example 2.

Synthesis of a liquid crystal molecule was carried out in the same manner as in Example 1 except for using (S)-4-penten-2-ol in place of (S)-5-hexen-2-ol in step S13 in the procedure for synthesizing a liquid crystal molecule in Example 1, to obtain 4'-{[(S)-1-methyl-4-(1,1,3,3,3-pentamethyldisiloxanyl)butyl]-oxy}-3'-nitro[1,1'-biphenyl]-4-yl 4-(dodecyloxy)benzoate as the final product. The liquid crystal molecule in this example had the structural formula (2), wherein $R_1=C_{12}H_{25}$, n=3, and $R_2=Si(CH_2-O-Si(CH_3)_3$. In addition, the final product was in the smectic A phase at 35 to 44° C. The dependency of tilt angle on impressed voltage at 40° C. is shown in FIG. 4.

Besides, in the same manner as in Example 1, an evaluation cell was fabricated using the liquid crystal molecules obtained above, and was evaluated.

Example 3

Figure 5:
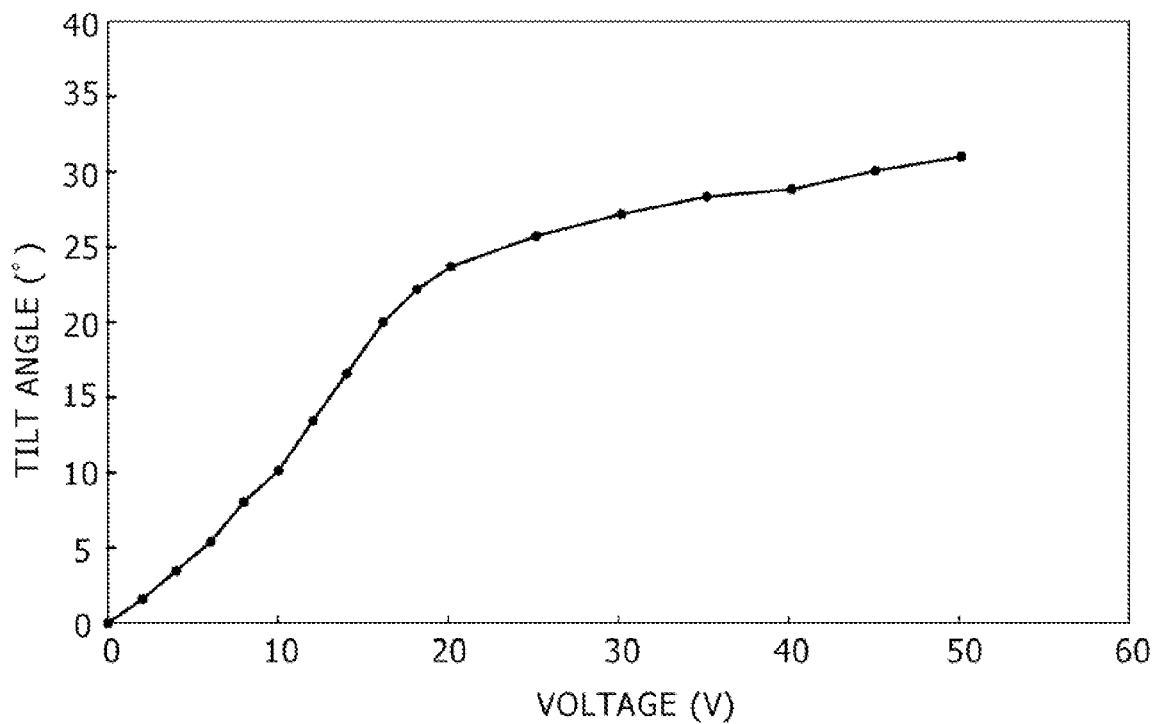
FIG. 5 is a diagram showing the relationship between voltage and tilt angle, for a cell under evaluation in Example 3.

Synthesis of a liquid crystal molecule was carried out in the same manner as in Example 1 except for using p-decaoxybenzoic acid in place of p-dodecaoxybenzoic acid in step S15 in the procedure for synthesizing a liquid crystal molecule in Example 1, to obtain 4'-{[(S)-1-methyl-5-(1,1,3,3,3-pentamethyldisiloxanyl)pentyl]oxy}-3'-nitro[1,1'-biphenyl]-4-yl 4-(decyloxy)benzoate as the final product. The liquid crystal molecule in this example had the structural formula (2), wherein $R_1=C_{10}H_{21}$, n=4, and $R_2=Si(CH_3)_2-O-Si(CH_3)_3$. In addition, the final product was in the smectic A phase at 26 to 55° C. The dependency of tilt angle on impressed voltage at 40° C. is shown in FIG. 5.

Besides, in the same manner as in Example 1, an evaluation cell was fabricated using the liquid crystal molecules obtained above, and was evaluated.

Comparative Example 1

Figure 6:
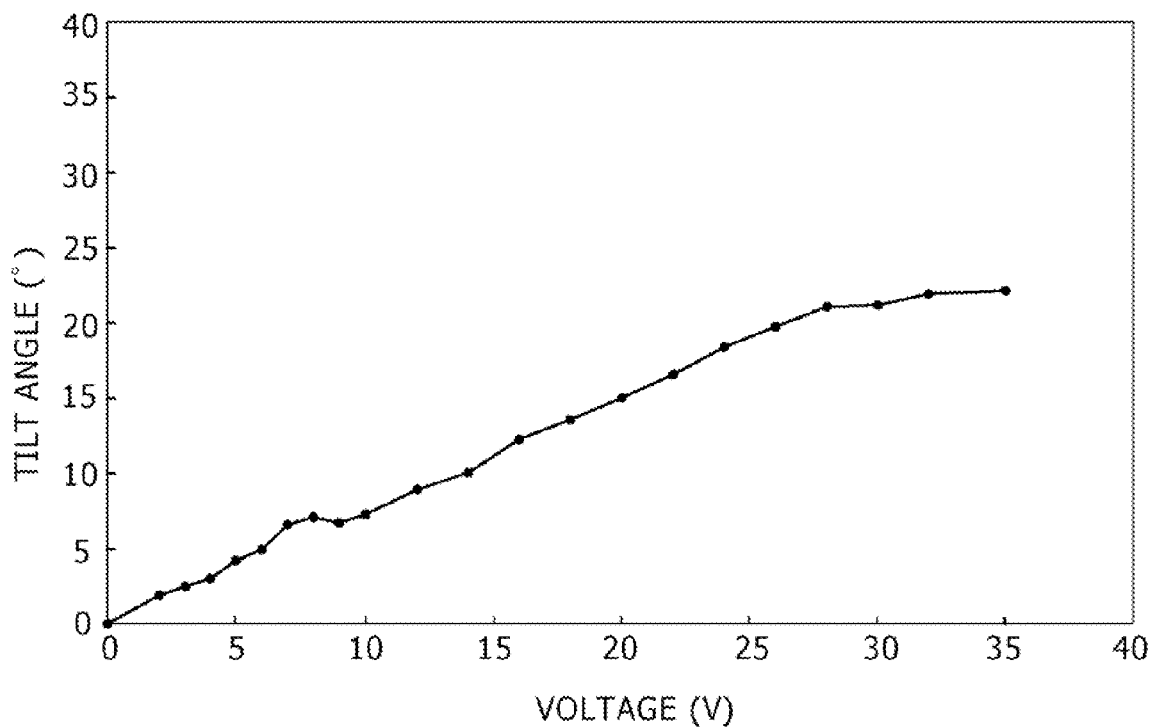
FIG. 6 is a diagram showing the relationship between voltage and tilt angle, for a cell under evaluation in Comparative Example 1.

Synthesis of a liquid crystal molecule was carried out in the same manner as in Example 1 except for using (S)-2-heptanol in place of (S)-5-hexen-2-ol in step S13 and using 4'-(5-hexnyloxy)benzoic acid in place of p-dodecaoxybenzoic acid in step S15 in the procedure for synthesizing a liquid crystal molecule in Example 1, to obtain 4-{3'-nitro-4'-[(S)-1-methylhexyloxy]phenyl}phenyl 4-(6-pentamethyldisiloxyhexyloxy)benzoate as the final product. The liquid crystal molecule in this comparative example had the structural formula (2), wherein $R_1$=$(CH_3)_3Si$—O—$Si(CH_3)_2C_6H_{12}$, n=4, and $R_2$=$CH_3$. In addition, the final product was in the smectic A phase at 38 to 55° C. The dependency of tilt angle on impressed voltage at 40° C. is shown in FIG. 6.

Comparative Example 2

Figure 7:
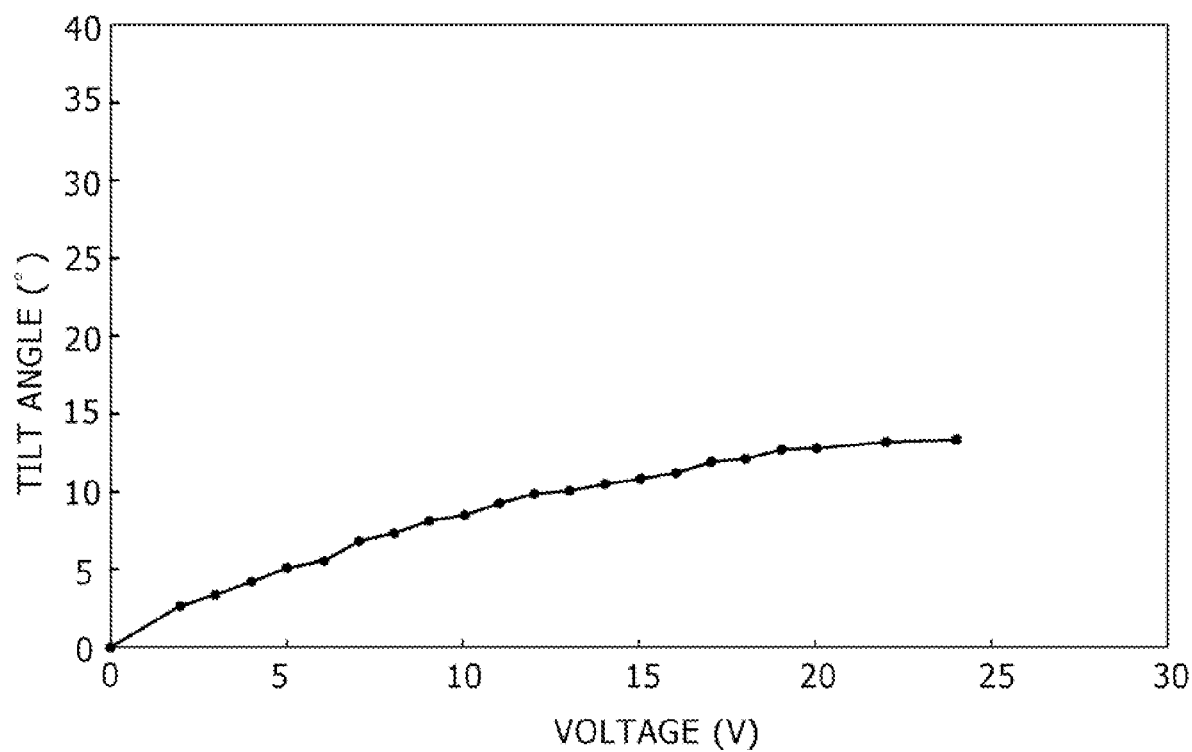
FIG. 7 is a diagram showing the relationship between voltage and tilt angle, for a cell under evaluation in Comparative Example 2.
Figure 8:
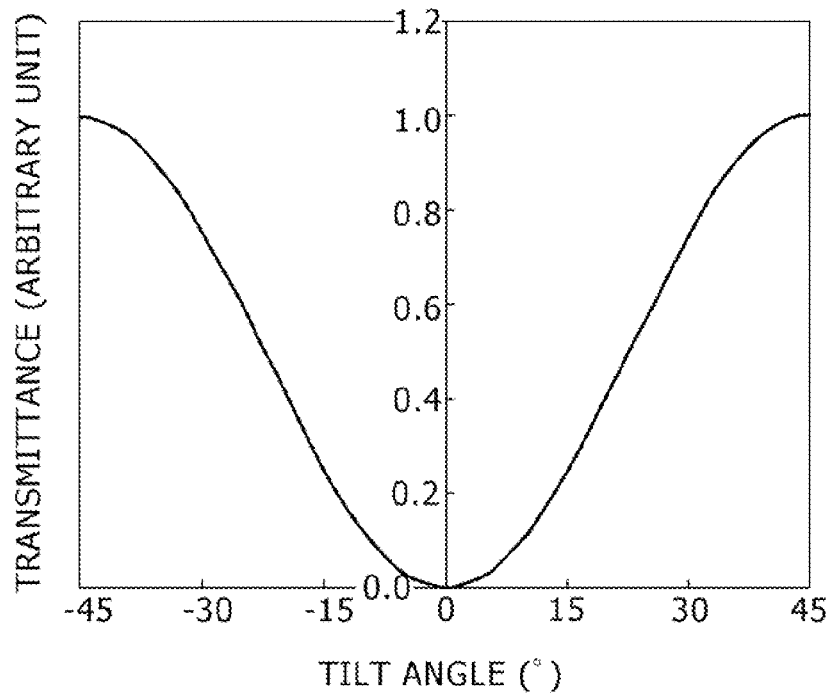
FIG. 8 is a diagram showing the relationship between tilt angle and transmittance, for a liquid crystal cell including liquid crystal molecules in smectic phase oriented uniaxially.

Synthesis of a liquid crystal molecule was carried out in the same manner as in Example 1 except for using (S)-2-heptanol in place of (S)-5-hexen-2-ol in step S13 and omitting the disiloxane addition step as step S16 in the procedure for synthesizing a liquid crystal molecule in Example 1, to obtain 4-{3'-nitro-4'-[(S)-1-methylhexyloxy]phenyl}phenyl 4-(dodecyloxy)benzoate as the final product. The liquid crystal molecule in this comparative example had the structural formula (2), wherein $R_1$=$C_{12}H_{25}$, n=4, and $R_2$=$CH_3$. In addition, the final product was in the smectic A phase at 30 to 80° C. The dependency of tilt angle on impressed voltage at 40° C. is shown in FIG. 7.

The above-mentioned evaluation results (the maximum tilt angle and the corresponding transmittance and response time, expressed in actually measured values) are set forth in Table 1 below.

The response time values were on the order of several tens of microseconds in all cases, the speeds being sufficiently high for driving at, for example, 240 Hz frame driving (frame time: 4.2 ms). However, in Comparative Example 2 in which siloxane addition was omitted, the maximum tilt angle was as small as 13.4°, and the transmittance was therefore as very low as about 20%. In Comparative Example 1 corresponding to a molecular structure in which a siloxane was added to a non-chiral terminal end of the molecule in Comparative Example 2, the maximum tilt angle was enhanced to be 22.1°, clearly showing the effect of the siloxane addition, but the transmittance was less than 50% and was unsatisfactory for practical use. In the case of a liquid crystal display device (LCD), power consumption is mostly by the backlight, and a liquid crystal material through which less than one half of the quantity of incident light can be transmitted produces a serious problem on a practical use basis.

On the other hand, in all of Examples 1 to 3 corresponding to molecular structures having a siloxane added to a chiral terminal end, the maximum tilt angle was not less than 30°, and the corresponding transmittance was not less than 75%. As is clear from comparison of Examples 1 to 3 with Comparative Example 1, the addition of a siloxane to the chiral terminal end was found to be much more effective than the addition of a siloxane to the non-chiral terminal end.

TABLE 1

|  | Example 1 | Example 2 | Example 3 | Comp. Ex. 1 | Comp. Ex. 2 |
|---|---|---|---|---|---|
| Maximum tilt angle | 33.3° | 35.2° | 30.7° | 22.1° | 13.4° |
| Transmittance | 83.2% | 87.7% | 75.0% | 47.2% | 19.4% |
| Response time | 90 μs | 78 μs | 86 μs | 52 μs | 27 μs |

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal molecule comprising an asymmetric carbon atom, and having a core portion and an organosilane or organosiloxane structure at positions opposed to each other with said asymmetric carbon atom therebetween.

2. A liquid crystal molecule comprising a structure of a general formula (1):

(1)

$$R_1-O-X_1-Y_1-X_2-Y_2-X_3-O-\overset{R_3}{\underset{R_4}{C^*}}-(CH_2)_n-R_2$$

where $R_1$ is a branched or unbranched hydrocarbon group having 4 to 16 carbon atoms, $R_2$ is a branched or unbranched organosiloxane or organosilane structure having 2 to 6 silicon atoms, * represents a chiral center, n=1 to 6, $R_3$ and $R_4$ are selected from among H, $CH_3$, $OCH_3$, F, Cl, Br, CN, and $CF_3$ and are different from each other;

$Y_1$ and $Y_2$ are each selected from among a group of formulas (a), in which - (hyphen) means omission; and $X_1$ is a group selected from among a group of formulas (b), $X_2$ is selected from among a group of formulas (c), in which - (hyphen) means omission, and $X_3$ is selected from a group of formula (d):

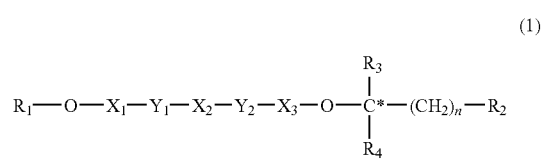

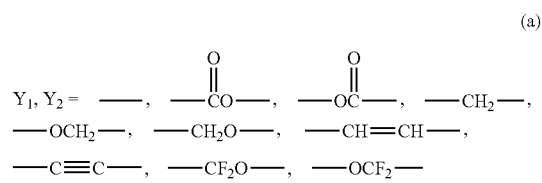

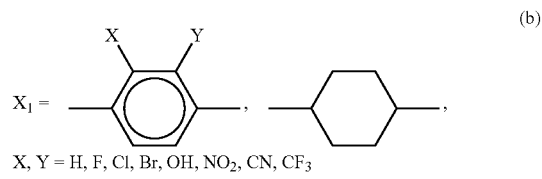

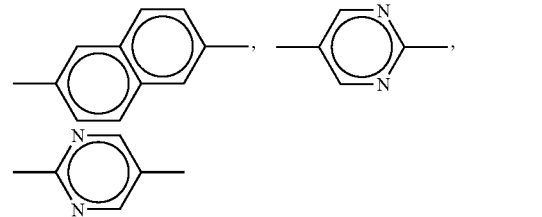

-continued

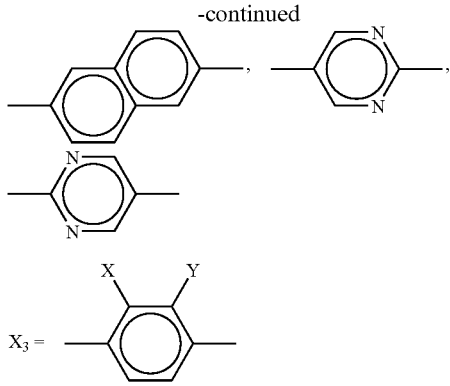

(d)

X, Y = H, F, Cl, Br, OH, NO$_2$, CN, CF$_3$ (provided at least one of X and Y is non-H)

3. A liquid crystal display device comprising:

a pair of transparent substrates;

a liquid crystal layer having liquid crystal molecules so disposed as to fill up a gap between said substrates, said liquid crystal molecules being in a smectic A phase in which they are oriented uniaxially; and electrodes provided on said substrates;

wherein the transmittance of said liquid crystal layer is regulated by inclining the longitudinal axis of said liquid crystal molecules through impressing an electric field on said liquid crystal layer through said electrodes, wherein the liquid crystal molecules have an asymmetric carbon atom, a core portion, and an organosilane or organosiloxane structure at positions opposed to each other with the asymmetric carbon atoms therebetween.

4. A liquid crystal optical spatial modulation device comprising:

a pair of transparent substrates;

a liquid crystal layer having liquid crystal molecules disposed as to fill up a gap between said substrates, said liquid crystal molecules being in a smectic A phase in which they are oriented uniaxially; and electrodes provided on said substrates;

wherein spatial modulation with regard to light transmitted through said liquid crystal layer is conducted by impressing an electric field on said liquid crystal layer through said electrodes, wherein the liquid crystal molecules have an asymmetric carbon atom, a core portion, and an organosilane or organosiloxane structure at positions opposed to each other with the asymmetric carbon atoms therebetween.

* * * * *